United States Patent Office 2,708,182
Patented May 10, 1955

2,708,182

PREPARATION OF OIL-SOLUBLE ORGANIC SULFONATES

Edward J. Jahn, St. Louis, Mo., assignor to Shell Development Company, Emeryville, Calif., a corporation of Delaware No Drawing. Application April 21, 1952, Serial No. 283,520

4 Claims. (Cl. 252—33)

This invention relates to the conversion of oil-soluble organic sulfonates having a particular cation to an oil-soluble organic sulfonate having a different cation. More particularly, this invention is concerned with the prepration of mineral oil solutions of alkaline earth metal petroleum sulfonates.

It is well known to treat petroleum oils with strong sulfuric acid. The sulfuric acid reacts with certain components of the oil to produce sulfonic acids, some of which are oil-soluble and some water-soluble. The reaction mixture obtained separates into two layers: an oil layer containing oil-soluble or mahogany sulfonic acids, and an acid sludge layer containing resinous materials, unreacted sulfuric acid and water-soluble or green sulfonic acids. After separation of the layers, the oil-soluble sulfonic acids are recovered from the oil layer, usually in the form of their sodium salts. The sodium mahogany sulfonates are generally admixed with substantial proportions of oil. The amount of oil present and the properties of the sodium sulfonates are dependent upon the source of oil and any concentration operation which has been carried out.

The sodium mahogany sulfonates thus obtained can be converted to mahogany sulfonates having a different cation by reaction with a suitable inorganic compound of the different cation. For the preparation of highly effective detergent additives for lubricating oils, the sodium sulfonates are converted into the corresponding alkaline earth metal sulfonates, such as calcium mahogany sulfonate. The calcium salt is generally prepared by reacting lime, calcium chloride and water with the sodium sulfonate-oil mixture. The product obtained when using lime with or without calcium chloride is an oil concentrate of a mixture of neutral calcium sulfonates and basic calcium sulfonates. The conversion of the sodium sulfonates to sulfonates having a different cation proceeds very slowly, particularly in the case of the relatively high molecular weight sulfonates. Moreover, when preparing a basic product from high molecular weight sodium sulfonates the product obtained does not have a sufficiently high control ratio. The control ratio indicates the degree of alkalinity of the product and is expressed as follows:

Control ratio = $\dfrac{\text{Alkalinity (mg KOH/g. concentrate)}}{\text{Percent sulfate ash}}$ Per cent sulfate ash is determined by acidifying the sample tested with dilute sulfuric acid, igniting the sample to free it of carbonaceous matter, and expressing the residue as per cent sulfate ash. The control ratio of a calcium mahogany sulfonate product should be at least 2 for most effective performance in lubricating oils.

It is, therefore, a principal object of the present invention to provide an improved process for the conversion of an oil-soluble organic sulfonate having a particular cation to an oil-soluble organic sulfonate having a different cation. A more specific object is to provide an improved process for the conversion of mineral oil solutions of alkali metal petroleum sulfonates to mineral oil solutions of polyvalent metal petroleum sulfonates, such as alkaline earth metal petroleum sulfonates. A further object is to provide an improved process for the preparation of an oil solution of calcium petroleum sulfonates having a sufficiently high control ratio to be most effective as a lubricating oil additive. Other objects and advantages of the invention will appear from the following description.

Now, in accordance with this invention, it has been found that, in the conversion of an oil-soluble organic sulfonate, particularly an oil-soluble petroleum sulfonate, having a particular cation to the corresponding oil-soluble organic sulfonate having a different cation, by reaction thereof with an aqueous dispersion or solution of a salt or base of the desired cation, which is preferably a polyvalent metal cation, the reaction proceeds more rapidly, and a more satisfactory product is obtained, when such conversion is effected in the presence of an emulsifying agent which promotes the formation of an oil-in-water emulsion.

A preferred embodiment of the present invention comprises preparing an oil solution of a polyvalent cation organic sulfonate by reacting an oil solution of a monovalent cation organic sulfonate with an aqueous solution or dispersion of an inorganic polyvalent metal compound, preferably a base or a water-soluble salt, in the presence of a non-ionic emulsifying agent.

According to a more preferred embodiment of the present invention, a mineral oil solution of an alkaline earth metal petroleum sulfonate is prepared by reacting a mineral oil solution of an alkali metal petroleum sulfonate with an aqueous solution or suspension of an inorganic alkaline earth metal compound in the presence of a non-ionic emulsifying agent.

A specific embodiment of this invention comprises preparing a mineral oil solution of calcium petroleum sulfonate by reacting a mineral oil solution of sodium petroleum sulfonate with an aqueous slurry of calcium hydroxide and calcium chloride in the presence of from about 5% to about 15%, by weight, based on the sodium petroleum sulfonate, of a polyoxyalkylene derivative of a fatty acid ester of sorbitan, such as a partially water-soluble polyoxyethylene sorbitan trioleate.

The non-ionic emulsifying agents which are utilized in the present invention, are amphipathic emulsifying agents, i. e., they have an affinity for both water and oil. A portion of each molecule is highly oleophilic, and another portion is highly hydrophilic. The oleophilic portion of the molecule may be a long hydrocarbon chain, as in fatty acid, or a cyclic hydrocarbon, or a combination of the two. In non-ionic emulsifying agents, the hydrophilic portion is composed chiefly of hydroxyl groups and/or ether linkages. Non-ionic emulsifying agents include organic acid esters and amides, such as esters and amides of fatty acids having at least 8 carbon atoms, and the polyoxyalkylene derivatives thereof; aliphatic alcohols, such as fatty alcohols having at least 8 carbon atoms in the aliphatic chain, and polyoxyalkylene ethers thereof; and polyoxyalkylene ethers of alkyl phenols. The polyoxyalkylene-containing non-ionic emulsifying agents, such as the polyoxyalkylene derivatives of fatty acid esters and amides, and the polyoxyalkylene ethers of fatty alcohols and alkyl phenols, and preferably those polyoxyalkylene-containing compounds having at least 5, preferably at least 10, oxyalkylene groups, are particularly efficacious for promoting the formation of an oil-in-water emulsion in the reaction system of the present invention. The okyalkylene group should contain not more than about 4, preferably about 2–3 carbon atoms. The polyoxyalkylene chain can be composed of mixed oxyalkylene groups, e. g., oxymethylene-oxyethylene groups, oxyethylene-oxypropylene groups, and the like.

The following examples are representative of the preferred groups of emulsifying agents: polyethylene glycol and polypropylene glycol mono- and diesters of stearic acid, coconut fatty acids and the like; N-polyoxyethylene substituted stearic acid amides, e. g., N-hydroxyethylene tetraoxyethylene stearamide; polyethylene oxide ethers of hydroxy esters of fatty acids, particularly the polyethylene oxide ethers of sorbitan and sorbitol esters of fatty acids, such as of sorbitan monolaurate, monopalmitate, monostearate, tristearate, monooleate, and trioleate, and of sorbitol laurate and oleate-laurate; polyethylene and polyproplyene oxide ethers of oleyl alcohol, lauryl alcohol, castor oil, dodecylphenol, beta-naphthol alkylated with a $C_6$–$C_8$ olefin fraction, and the addition product of polyethylene glycol and dioctyl maleate. The polyalkylene oxide ethers of sorbitan esters of fatty acids have been found to be particularly effective. Other non-ionic emulsifying agents which can be used include: fatty acid amides of diethanolamine, of trimethylolaminomethane and of diglycerol amine; polyalkylene oxide derivatives of disulfimides; polyalkylene oxide derivatives of hydrophobic organic sulfonamides; and fatty acid derivatives containing a multiplicity of amide and hydroxy groups.

The present invention is particularly applicable to the conversion of relatively high molecular weight alkali metal petroleum sulfonates, i. e., having a molecular weight of at least 500, preferably between about 600 and about 700, to the corresponding divalent metal petroleum sulfonates, particularly the alkaline earth metal petroleum sulfonates. Particularly suitable oil fractions for the preparation of the alkali metal petroleum sulfonates are raffinates obtained by selective solvent extraction, as by the Edeleanu (sulfur dioxide) process, or by furfural extraction, extraction with phenol, etc., of distillates of naphthenic or mixed base character such as West Texas Ellenberger (WTE) and Oklahoma Crude (OC) lubricating oil distillates which may or may not have been dewaxed, as by propane or solvent dewaxing. The properties of four such raffinate fractions, after separation by steam distillation, are given in Table I.

TABLE I

|  | WTE | | OC | |
| --- | --- | --- | --- | --- |
|  | 400 Raffinate | 500 Raffinate | 400 Raffinate | 500 Raffinate |
| Gravity, API | 28.2 | 28.2 | 28.4 | 28.0 |
| Color, NPA | 4½ | 4½ | 3½ | 3½+ |
| Pour Point, °F | +5 | +5 | +5 | +10 |
| Flash (Open Cup), °F | 490 | 470 | 480 | 495 |
| Viscosity, SUS, at 100° F | 464.7 | 500 | 469 | 599 |
| Viscosity, SUS, at 210° F | 61.7 | 64.2 | 62.0 | 66.4 |
| VI (D and D) | 99 | 100 | 98 | 93 |
| Specific Dispersion | 113 | 114 | 111 | 112 |
| Max. Distillat. Temp., °F | 620 | 630 | 620 | 630 |
| Vacuum, mm. of Hg, abs | 45 | 45 | 45 | 45 |

Various well-known sulfonating agents may be utilized. With the oil fractions specifically described in Table I, concentrated sulfuric acid of about 98–100% has been found to be very satisfactory; fuming sulfuric acid (about 105% $H_2SO_4$) can be used, if desired. The preparation of the sulfonic acids and salts thereof may be effected in any suitable manner. For example, a raffinate fraction as described in Table I is sulfonated with three separate acid charges of 10, 15, and 20 pounds of 98% sulfuric acid per barrel of oil at ambient atmospheric temperature. The reaction mixture is permitted to settle to obtain an oil layer containing petroleum mahogany sulfonic acids dissolved therein and an acid sludge layer.

After separation of the acid sludge from the oil phase, the oil phase containing oil-soluble sulfonic acids, preferably after air-blowing to remove sulfur dioxide, can be neutralized, e. g., with a monovalent metal hydroxide such as caustic soda, to obtain an oil solution containing from about 2% to about 10% of oil-soluble petroleum sulfonates. Although this crude solution can be used as the starting material in the conversion process of the present invention, it is usually desirable to employ an oil solution containing at least 40% of petroleum sulfonates. The concentration of the sulfonates can be accomplished by any suitable method. According to one procedure, the crude oil solution of sulfonates is treated with aqueous tertiary butyl alcohol to obtain an oil concentrate containing from about 40% to 60% of sulfonates.

It is also possible to extract the oil solution containing the free petroleum sulfonic acids with an aqueous solution of a lower aliphatic alcohol, e. g., a monohydric alcohol of 1 to 3 carbon atoms, such as aqueous methanol, aqueous ethanol or aqueous isopropanol, and then neutralize the resulting concentrated petroleum sulfonic acids, e. g., with caustic soda. By this procedure, an oil solution containing about 50% to about 65% of oil-soluble petroleum sulfonates can be obtained.

Still another procedure, which is particularly suitable for concentrating the product obtained from a raffinate fraction as described in Table I, is the so-called "Two Solvent Method." According to this method, the oil phase containing oil-soluble sulfonic acids, after separation from the acid sdudge, and preferably after air-blowing, is extracted with about 5% to about 50% of the volume of the oil charge of an aqueous solution of a lower aliphatic alcohol, e. g., a monohydric alcohol of 1 to 3 carbon atoms, such as aqueous methanol, aqueous ethanol or aqueous isopropanol. The aqueous alcohol extract is then suitably mixed with a water-immiscible organic solvent for oil-soluble hydrocarbon sulfonates, e. g., a light naphtha fraction boiling from about 170°–250° F. The proportion of solvent employed can vary from about one-fourth to about 10 times the volume of the aqueous alcohol of the sour alcohol extract. The mixture is then neutralized, e. g., with caustic soda, whereupon two liquid phases are formed: an aqueous alcoholic phase and an oil phase containing oil-soluble sodium petroleum sulfonates. After separation of the phases, the light naphtha solvent is removed from the oil solution of sulfonates. The resulting purified and concentrated solution usually contains about 60% to about 75% of oil-soluble petroleum sulfonates. The amount of oil present depends upon the source and nature of the oil.

The oil solution of petroleum sulfonates, obtained by any of the above-described procedures, or by any other suitable procedure, is then reacted with a compound, particularly a salt and/or a base containing the desired cation, preferably, a polyvalent cation, in the presence of about 80% to about 200%, by weight, based on the petroleum sulfonates in the oil solution, of water and in the presence of about 5% to about 15%, by weight, based on the petroleum sulfonates in the oil-solution of a non-ionic emulsifying agent, whereby an oil-in-water emulsion is formed. The reaction mixture is maintained at a temperature of about 170° F. to about 200° F., until an analysis shows the reaction to be complete.

The resulting emulsion is cooled to a temperature of about 125° F. to about 150° F. and then extracted with about 175% to about 225%, by weight, based on the oil-sulfonate charge, of a light naphtha fraction having a boiling range between about 170° F. to about 250° F. The solvent extract of the mineral oil concentrate of petroleum sulfonates having a different cation is separated from the aqueous phase, and the naphtha solvent is then removed from the concentrate.

The following example illustrates a specific embodiment of the present invention:

*Example 1*

A mineral oil solution containing about 70%–75%, by weight, of sodium petroleum sulfonates was obtained from an OC 500 Raffinate, specifically described in Table I, by the above-described sulfonation procedure and "Two Solvent Method" of purification and concentration. The sodium petroleum sulfonate concentrate was then admixed with an aqueous slurry of calcium hydroxide, in an amount of about 0.5 to 0.6 moles/mol of sodium sulfonates, and calcium chloride in an amount of about 1.5 to about 1.75 moles/mol of sodium sulfonates. The amount of water present in the mixture was about 80%, by weight, based on the sodium sulfonates. About 10% by weight, based on the sodium sulfonates, of a polyoxyethylene derivative of sorbitan trioleate, as sold under the trade name "Tweens 85," by Atlas Powder Company, was added to the reaction mixture. The reaction mixture was maintained at a temperature of about 170° to about 200° F. with agitation, until the reaction was complete. The resulting emulsion was cooled to about 140° F., and then extracted with about 200%, by weight, based on the oil-sulfonate charge, of a light naphtha fraction having a boiling range of about 170° F. to about 250° F. The entire mix was then centrifuged, and the naphtha flashed off to obtain a mineral oil concentrate of calcium petroleum sulfonates.

For purposes of comparison, the above-described process was carried out in the absence of any added emulsifying agent. The results are set forth in Table II:

TABLE II

|  | Time, Hours | Control Ratio |
|---|---|---|
| With Emulsifier | 1 | 2.61 |
| Without Emulsifier | 5 | 0.98 |

*Example II*

A mineral oil solution containing about 65% to about 70%, by weight, of sodium petroleum sulfonates, obtained from a WTE 500 Raffinate, described in Table I, by the above-described sulfonation procedure and "Two Solvent Method" of purification and concentration, was converted to a mineral oil solution of calcium petroleum sulfonates, according to the procedure described in Example I, and both in the presence and in the absence of an emulsifying agent. The results are shown in Table III.

TABLE III

|  | Time, Hours | Control Ratio |
|---|---|---|
| With Emulsifier | 1 | 2.32 |
| Without Emulsifier | 5 | 1.05 |

It will be noted from the results given in Tables II and III, that the time required for reaction was considerably decreased and the control ratio was considerably increased by the presence of a non-ionic emulsifying agent during the conversion step.

The present invention is particularly applicable to the conversion of an oil-soluble monovalent cation organic sulfonates to the corresponding oil-soluble polyvalent cation organic sulfonates. Thus, ammonium, sodium, potassium, lithium, and organic amine sulfonates, and the like, as well as free sulfonic acids, can be converted to such oil-soluble polyvalent cation organic sulfonates as calcium, barium, strontium, magnesium, zinc, iron, copper and aluminum sulfonates, and the like.

Although the invention has been described somewhat in detail with reference to the preparation of oil-soluble petroleum sulfonates, it is equally applicable to the preparation of other oil-soluble organic sulfonates which may be prepared synthetically. Thus, it is useful for the conversion of sodium di-(propylene tetramer alkylate) of tetralin sulfonate to an oil solution of the corresponding magnesium sulfonate, and also the barium sulfonate, by reacting the sodium sulfonate with an aqueous solution of magnesium chloride, or barium chloride, in the presence of mineral oil.

I claim as my invention:

1. In a process for the conversion of a mineral oil solution of sodium petroleum sulfonates to a mineral oil solution of the corresponding calcium petroleum sulfonates wherein said mineral oil solution of sodium petroleum sulfonates is reacted with calcium chloride and calcium hydroxide at a temperature of about 180° F. to about 200° F., in the presence of about 80% by weight, of water based on the sodium petroleum sulfonates, the improvement comprising effecting said conversion in the presence of about 10%, by weight, based on the sodium petroleum sulfonates, of a partially water-soluble polyoxethylene derivative of sorbitan trioleate.

2. In a process for the conversion of a mineral oil solution of alkali metal pertoleum sulfonates to a mineral oil solution of the corresponding alkaline earth metal petroleum sulfonates wherein said mineral oil solution of alkali metal petroleum sulfonates is reacted with an inorganic alkaline earth metal compound in the presence of water, the improvement comprising effecting said conversion in the presence of from about 5% to about 15%, by weight, based on the alkali metal petroleum sulfonates, of a polyoxyalkylene derivative of an ester of sorbitan and a fatty acid having at least 8 carbon atoms, the polyoxyalkylene radical containing at least 5 oxyalkylene groups and the alkylene radical containing not more than 4 carbon atoms.

3. In a process for the conversion of a mineral oil solution of alkali metal petroleum sulfonates to a mineral oil solution of alkaline earth metal petroleum sulfonates wherein said mineral oil solution of alkali metal petroleum sulfonates is reacted with a water-soluble inorganic alkaline earth metal salt and a basic inorganic alkaline earth metal compound in the presence of water, the improvement comprising effecting said conversion in the presence of an amount of a polyoxyalkylene derivative of an ester of sorbitan and a fatty acid having at least 8 carbon atoms sufficient to promote the formation of an oil-in-water emulsion, the alkylene radicals of said derivative containing not more than 4 carbon atoms.

4. In a process for the conversion of a mineral oil solution of alkali metal petroleum sulfonates to a mineral oil solution of alkaline earth metal petroleum sulfonates wherein said mineral oil solution of alkali metal petroleum sulfonates is reacted with an inorganic alkaline earth metal compound in the presence of water, the improvement comprising effecting said conversion in the presence of an amount of a polyoxyalkylene derivative of an ester of sorbitan and a fatty acid having at least 8 carbon atoms sufficient to promote the formation of an oil-in-water emulsion, the alkylene radicals of said derivative containing not more than 4 carbon atoms.

References Cited in the file of this patent

UNITED STATES PATENTS

| 2,453,690 | Bray | Nov. 16, 1948 |
| 2,467,176 | Zimmer | Apr. 12, 1949 |
| 2,595,557 | Worth | May 6, 1952 |